United States Patent
Nakamura

(10) Patent No.: US 8,265,459 B2
(45) Date of Patent: Sep. 11, 2012

(54) RECORDING APPARATUS, METHOD OF CONTROLLING RECORDING APPARATUS, AND COMPUTER-READABLE RECORDING MEDIUM

(75) Inventor: Yumiko Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1057 days.

(21) Appl. No.: 12/222,969

(22) Filed: Aug. 20, 2008

(65) Prior Publication Data

US 2009/0010611 A1   Jan. 8, 2009

Related U.S. Application Data

(63) Continuation of application No. PCT/JP2006/304722, filed on Mar. 10, 2006.

(51) Int. Cl.
*H04N 5/76* (2006.01)
(52) U.S. Cl. ........................... 386/292; 386/293
(58) Field of Classification Search .......... 386/292, 386/293
See application file for complete search history.

(56) References Cited

U.S. PATENT DOCUMENTS

2004/0123077 A1* 6/2004 Shebanow et al. ............ 712/217

FOREIGN PATENT DOCUMENTS

| JP | 9-182035 | 7/1997 |
|----|----------|--------|
| JP | 11-355703 | 12/1999 |
| JP | 2001-36861 | 2/2001 |
| JP | 2001-298686 | 10/2001 |
| JP | 2002-157821 | 5/2002 |
| JP | 2003-069927 | 3/2003 |
| JP | 2003-162884 | 6/2003 |
| JP | 2003-309792 | 10/2003 |
| JP | 2004-235772 | 8/2004 |
| JP | 2005-101751 | 4/2005 |

OTHER PUBLICATIONS

URL:http://www.FMWORLD.net/biz/fmv/product/hard/security/fmsec101/authenticate.html.
International Search Report for PCT/JP2006/304722, mailed Apr. 11, 2006.

* cited by examiner

*Primary Examiner* — Thai Tran
*Assistant Examiner* — Jose Mesa
(74) *Attorney, Agent, or Firm* — Staas & Halsey LLP

(57) ABSTRACT

A recording apparatus has a configuration in which plural reservation cards having different strengths are distributed to each user, each user being able to set its own reservation card when actually reserving an operation of recording data. The strengths of the reservation cards set by users are compared when there is conflict of reservation time between the users. The reservation of the recording operation of the stronger user according to the result of the comparison is accepted, and the reservation card corresponding to the reservation accepted by the accepting part is invalidated.

9 Claims, 9 Drawing Sheets

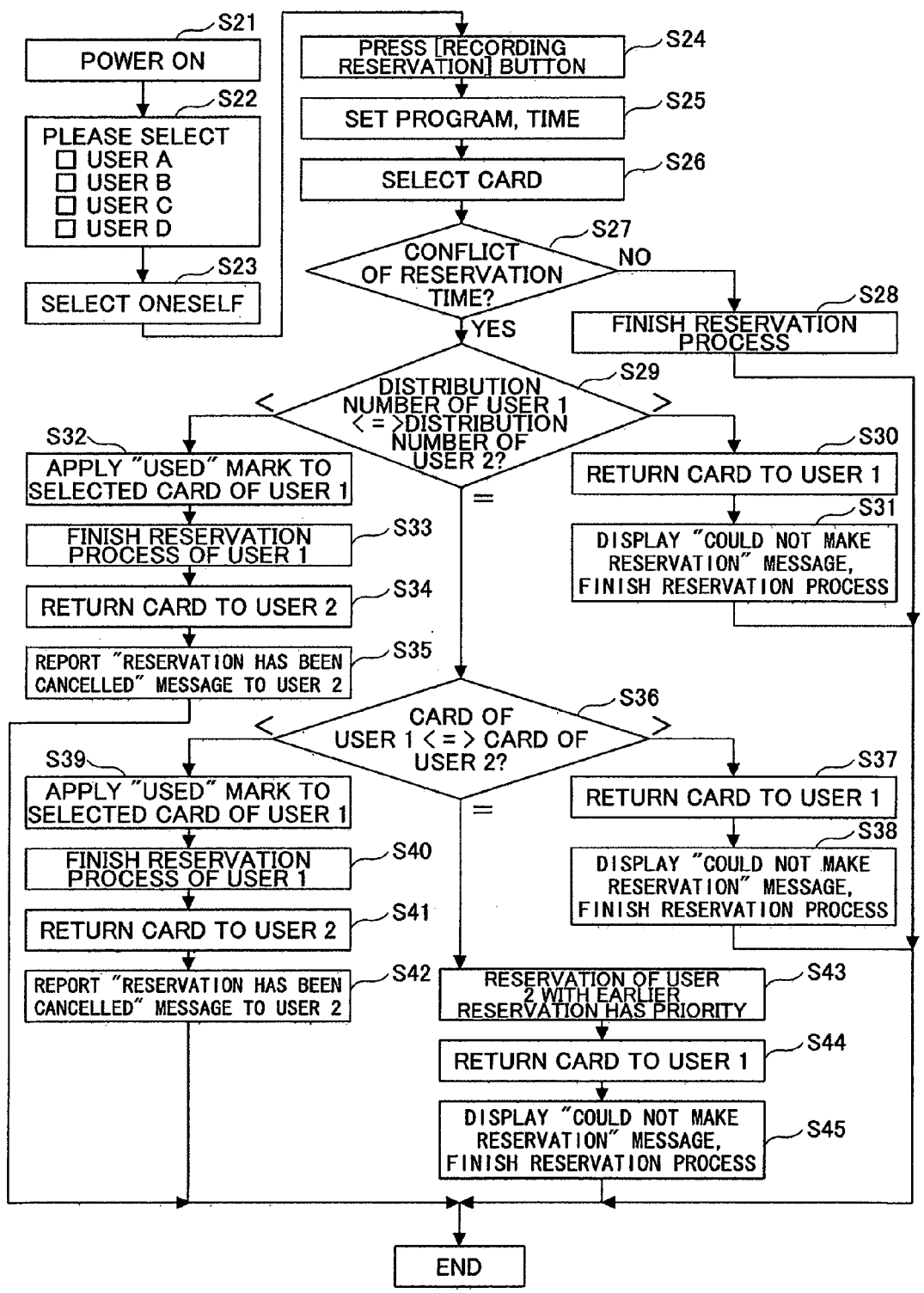

FIG.7

| USER NAME |
|---|
| NUMBER OF DISTRIBUTION |
| STATUS OF USING 10 CARD |
| STATUS OF USING 9 CARD |
| . |
| . |
| . |
| STATUS OF USING 1 CARD |

FIG.8

PLEASE SELECT CARD.
 CARD HAVING SMALLER NUMBER IS A STRONGER CARD.
 CARD WITH AN X CANNOT BE SELECTED SINCE IT IS USED.

| NUMBER OF DISTRIBUTION | 1ST TIME |
|---|---|

| X | 2 | 3 | 4 | X |
|---|---|---|---|---|
| 6 | X | 8 | 9 | 10 |

RECORDING APPARATUS, METHOD OF CONTROLLING RECORDING APPARATUS, AND COMPUTER-READABLE RECORDING MEDIUM

CROSS-REFERENCE TO RELATED APPLICATION

This application is a U.S. continuation application filed under 35 USC 111(a) claiming benefit under 35 USC 120 and 365(c) of PCT application JP2006/304722, filed on Mar. 10, 2006. The foregoing application is hereby incorporated herein by reference.

BACKGROUND OF THE INVENTION

1. Field of the Invention

The present invention generally relates to a recording apparatus, a method of controlling a recording apparatus, and a computer-readable recording medium, and more particularly to a recording apparatus having a function of reserving a data recording operation, a method of controlling the recording apparatus, a computer-readable recording medium on which a program for causing the recording apparatus to execute the method is recorded.

2. Description of the Related Art

As one example of a recording apparatus that records data, there is one that has a function of receiving a television program and recording the television program. Such recording apparatus may include a function of allowing the user to reserve time for recording a program beforehand.

In a case where a single recording apparatus (e.g., domestically used recording apparatus) is shared by plural users, there may be a case where the plural users desire to reserve recording of television programs of plural television stations at the same time. This state of conflicting reservations is hereinafter simply referred to as "reservation conflict".

In a case where reservation conflict occurs, the user making an earlier reservation usually has priority. However, according to circumstance, there may be a case where a user making a later reservation strongly desires to make the reservation. In this case, although it may be possible to resolve this by negotiating with the user making the earlier reservation, such negotiation may be bothersome and difficult to realize according to circumstance.

In Japanese Laid-Open Patent Application No. 2001-298686 (hereinafter referred to as "Patent Document 1") and Japanese Laid-Open Patent Application No. 11-355703 (hereinafter referred to as "Patent Document 2"), there is disclosed a configuration that conducts a settlement regarding reservation conflict according to a predetermined order of priority. In the disclosed art of Patent Document 1, settlement regarding reservation conflict is conducted based on the order of priority among users. In Patent Document 2, settlement regarding reservation conflict is conducted based on the order of priority among programs.

However, in the case of Patent Document 1, a reservation of a specific user will always have priority if the order of priority among the users is fixed. This would be unfair for the other users.

Furthermore, in the case of Patent Document 2, a specific user may be handled with priority depending on how the order of priority among programs is decided. This would also be unfair for the other users.

Although this problem may be resolved by negotiations among the users whenever this occurs, conducting negotiation whenever this occurs may be bothersome and difficult to realize according to circumstance.

SUMMARY OF THE INVENTION

It is a general object of the present invention to provide a recording apparatus, a method of controlling a recording apparatus, and a computer-readable recording medium that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a recording apparatus, a method of controlling a recording apparatus, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a recording apparatus having a function of reserving an operation of recording data, including: a reservation card distributing part configured to distribute a plurality of reservation cards having different strengths to each user, each user being able to set its own reservation card when actually reserving an operation of recording data; a comparing part configured to compare the strengths of the reservation cards set by users when there is conflict of reservation time between the users; an accepting part configured to accept the reservation of the recording operation of the stronger user according to the result of the comparison by the comparing part; and an invalidating part configured to invalidate the reservation card corresponding to the reservation accepted by the accepting part according to the result of the comparison.

Furthermore, another embodiment of the present invention provides a method of controlling a recording apparatus having a function of reserving an operation of recording data, including: a reservation card distributing step for distributing a plurality of reservation cards having different strengths to each user, each user being able to set its own reservation card when actually reserving an operation of recording data; a comparing step for comparing the strength of the reservation cards set by users when there is conflict of reservation time between the users; an accepting step for accepting the reservation of the recording operation of the stronger user according to the result of the comparison by the comparing step; and an invalidating step for invalidating the reservation card corresponding to the reservation accepted by the accepting step according to the result of the comparison.

Furthermore, another embodiment of the present invention provides a computer-readable recording medium on which a program for causing a computer to conduct a method of controlling a recording apparatus having a function of reserving an operation of recording data is recorded, the method including: a reservation card distributing step for distributing a plurality of reservation cards having different strengths to each user, each user being able to set its own reservation card when actually reserving an operation of recording data; a comparing step for comparing the strength of the reservation cards set by users when there is conflict of reservation time between the users; an accepting step for accepting the reservation of the recording operation of the stronger user according to the result of the comparison by the comparing step; and an invalidating step for invalidating the reservation card corresponding to the reservation accepted by the accepting step according to the result of the comparison.

Other objects and further features of the present invention will be apparent from the following detailed description when read in conjunction with the accompanying drawings.

BRIEF DESCRIPTION OF THE DRAWINGS

FIG. 6 is a flowchart of an operation during recording reservation by a recording apparatus according to an embodiment of the present invention;

FIG. 7 is a diagram showing an example of a record recorded with data regarding reservation cards for each user in a recording apparatus according to an embodiment of the present invention;

FIG. 8 is a diagram showing an example of a reservation card selection screen displayed to the user during the operation shown in FIG. 6.

DESCRIPTION OF THE PREFERRED EMBODIMENTS

In the following, embodiments of the present invention are described with reference to the accompanying drawings.

Figure 1:
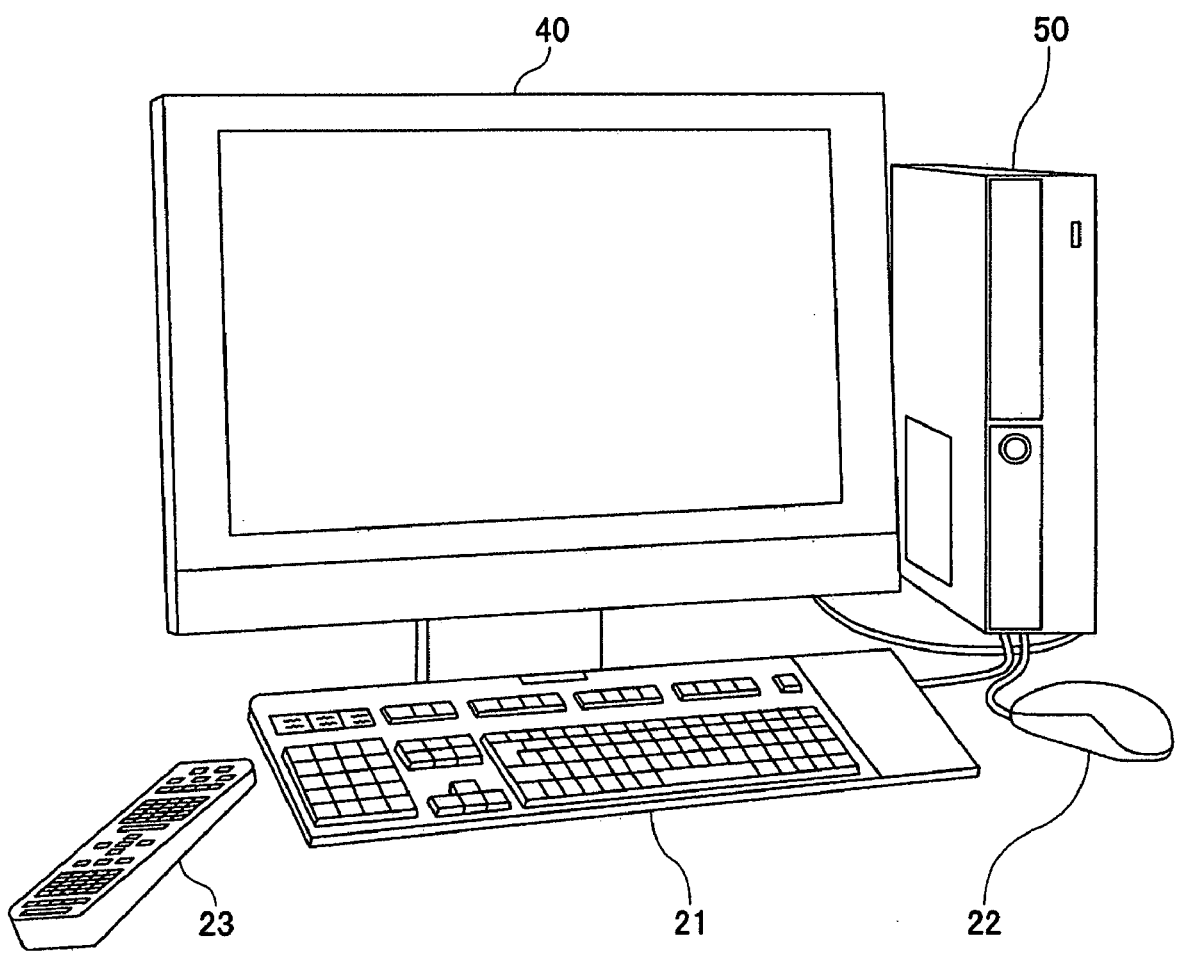
FIG. 1 is an external view of a personal computer to which a recording apparatus according to an embodiment of the present invention can be applied.

FIG. 1 shows an exterior view of a personal computer to which a recording apparatus according to an embodiment of the present invention can be applied. Furthermore, FIG. 2 is a block diagram of the inside of the personal computer.

As exemplarily shown in FIG. 1, the personal computer includes a main body 50, a display 40, a keyboard 21, a mouse 22, and a remote control device 23.

Figure 2:
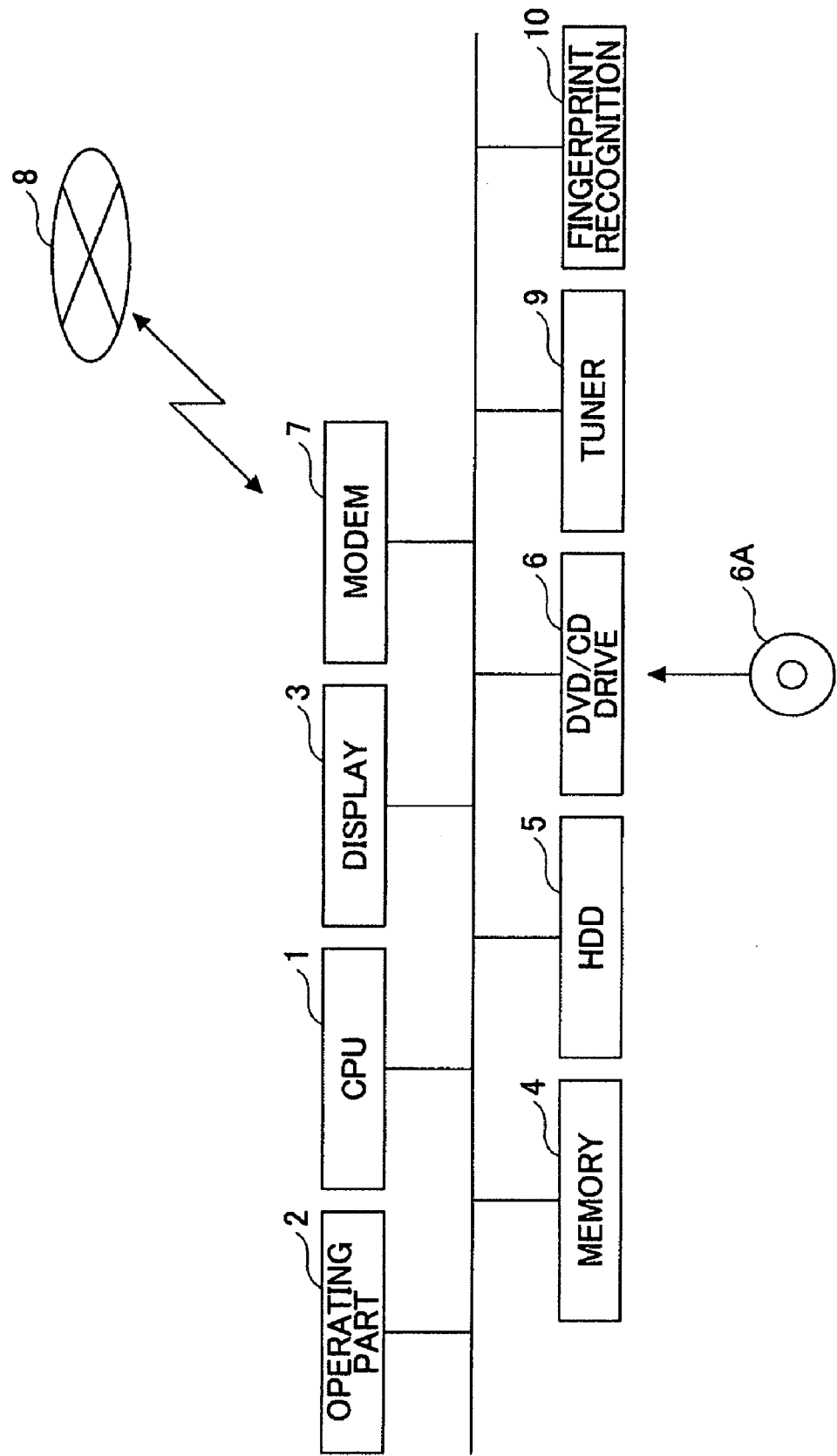
FIG. 2 is a block diagram of the inside of the personal computer shown in FIG. 1.

Furthermore, as exemplarily shown in FIG. 2, the main body 50 of the personal computer includes a CPU 1, a memory 4, a hard disk device 5, a DVD/CD drive 6, a modem 7, and a tuner 9.

Moreover, the personal computer also includes a display 3 corresponding to the display 40, an operating part 2 corresponding to the keyboard 21, the mouse 22, and the remote control device 23, and a fingerprint recognition device 10 (not shown in FIG. 1).

These parts are connected by a bus so that the parts can communicate with each other. The tuner 9 and the fingerprint recognition device 10 are connected to the bus via a preferred interface (not shown).

Furthermore, the fingerprint recognition device 10 is configured to detect fingerprint data by having the user's finger slid above its sensor part.

Furthermore, by providing the tuner 9 in the personal computer, television programs are received and viewing is made possible. Furthermore, data of the received television programs (hereinafter simply referred to as "contents") are stored in the hard disk device 5 or the DVD/CD drive 6 via a DVD 6A (hereinafter simply referred to as "hard disk apparatus 5 and the like") and made available for reproduction and viewing afterward.

In a case of receiving and viewing contents with the personal computer, the tuner 9 is operated after connecting the tuner 9 to a predetermined reception antenna.

The user can view received contents or reproduced contents on the display 40 (3) of the personal computer by operating the remote control device 23 in the same manner as operating a remote control device of a typical television.

Furthermore, the fingerprint recognition device 10 is used as a user distinguishing/certifying function device of the personal computer as described below.

The elements of the personal computer except for those related to the functions of receiving/recording/reproducing/viewing contents are basically the same as those of a known personal computer and further explanation thereof is omitted.

Next, a method of controlling a recording apparatus according to an embodiment of the present invention is described with reference to FIGS. 3, 4, 5A-5C, 6, 7, 8, and 9.

The below-described method of controlling a recording apparatus is realized by functions of the personal computer (as described above with FIGS. 1 and 2) serving as the recording apparatus according to this embodiment of the present invention.

A control program, which includes commands for enabling the CPU 1 of the personal computer to conduct the method of controlling the recording apparatus according this embodiment of the present invention, is fabricated. The program is installed in, for example, a CD-ROM 6A serving as a portable recording medium (computer-readable recording medium). Furthermore, the program is loaded into the hard disk device 5 of the personal computer via the DVD/CD drive 6. The CPU 1 loads the program from the hard disk device 5 into the memory 4 and successively reads out commands, to thereby execute the program.

The loading of the program into the personal computer is not limited to the method of using the portable recording medium. For example, it is possible to use a method of using a modem 7 and downloading the program from an outside server via a communication network 8 such as the Internet.

More specifically, the CPU 1, in accordance with commands from the program, executes the method of controlling the recording apparatus by suitably using, for example, the display 3, the memory 4, the hard disk device 5, the DVD/CD drive 6, the tuner 9, and the fingerprint recognition device 10.

Figure 3:
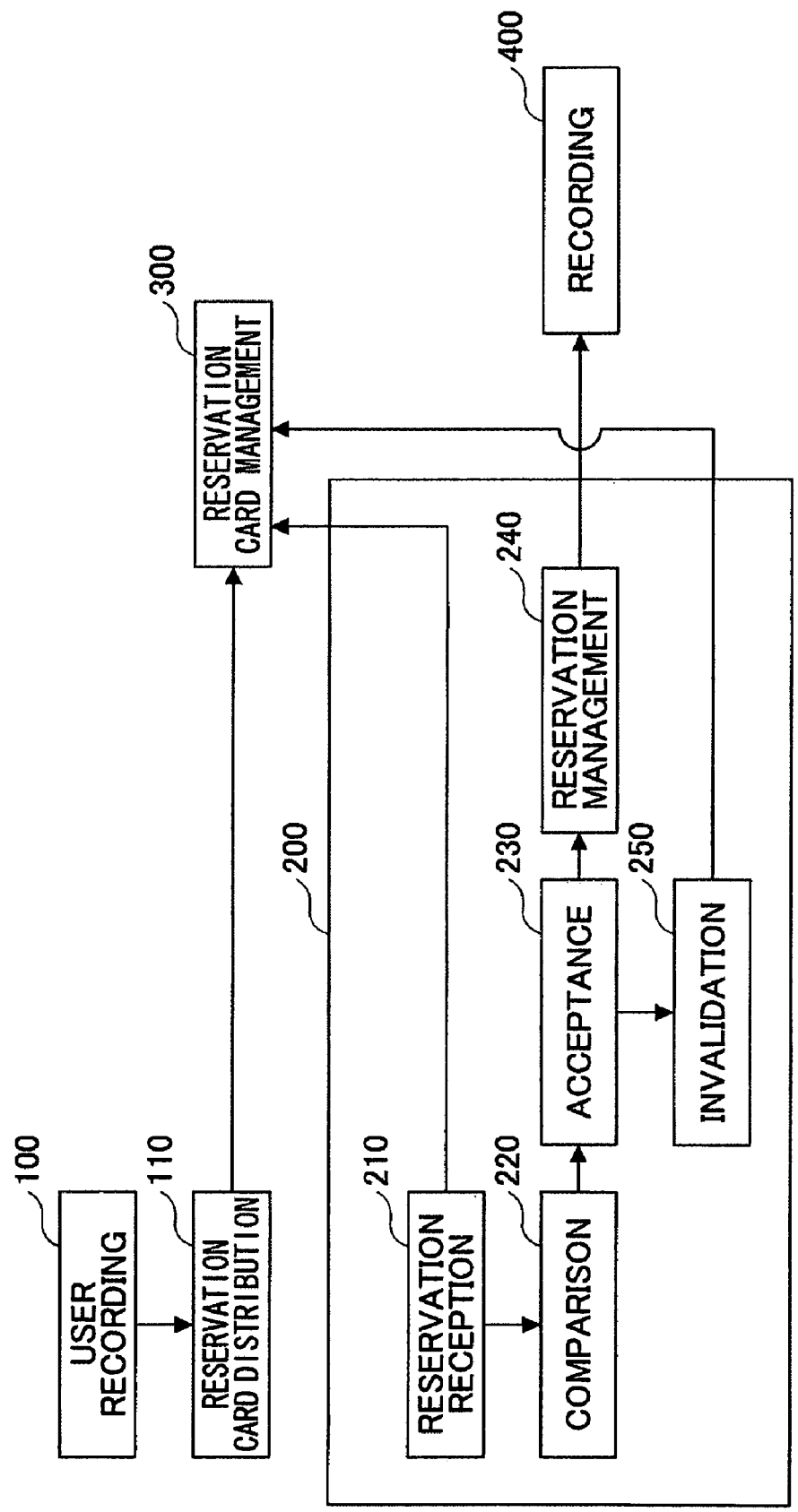
FIG. 3 is a block diagram of the functions of a recording apparatus according to an embodiment of the present invention.

As exemplarily shown in FIG. 3, the method of controlling the recording apparatus is realized by function parts including a user registering part 100, a reservation card distributing part 110, a reserving part 200, a registration card managing part 300, and a recording part 400 serving as functions of the above-described program executed by the CPU 1.

Furthermore, the reserving part 200 has function parts including a reservation receiving part 210, a comparing part 220, an accepting part 230, a reservation managing part 240, and an invalidating part 250.

These function parts achieve the following functions.

That is, the user registering part 100 is a function part for registering users in the personal computer (recording apparatus). The reservation card distributing part 110 is a function part for distributing a reservation card (described below) to each registered user.

The reserving part 200 is a function part for performing processes related to reservation of recording image data and audio data of television programs (hereinafter simply referred to as "contents") received by a function of the tuner 9. The reservation card managing part 300 is a function part for managing reservation cards distributed to each user.

The recording part 400 is a function part for executing recording (that is, image recording) of predetermined contents according to instructions from the reserving part 200. Here, the recording of contents is performed by storing contents received by the tuner 9 in the hard disk device 5 and the like according to the function of the recording part 400.

The reservation receiving part 210 included in the reserving part 200 is a function part for receiving recording reservations (that is, image-recording reservations) of contents from the user. The comparing part 220 is a function part for comparing reservation cards of reservations in a case where reservation conflict occurs.

The accepting part 230 is a function part for accepting a reservation set with a reservation card with a higher strength as a result of the comparison by the comparing part 220. The reservation managing part 240 is a function part for managing recording reservations that are received by the reservation receiving part 210, and in some cases, recording reservations that are accepted after being subject to the functions of the comparing part 220 and the accepting part 230.

The invalidating part 250 is a function part for invalidating reservation cards corresponding to reservations that are actually accepted by the function of the accepting part 230 according to the comparison results by the comparing part 220.

The reservation managing part 240 has reservation management data. The reservation management data are for recording reservation data whenever recording a reservation is performed by operation of the user as described above. Among the contents of the reservation management data, the reservation managing part 240 compares the recording content corresponding to the item of reservation time/date and the actual time/date and allows the tuner to receive corresponding contents by automatically activating the tuner 9 when the reservation time/date arrives.

The contents obtained from the reception of the tuner 9 are stored in the hard disk device 5 and the like by the function of the recording part 400. Accordingly, when the recording of the contents is completed, the reservation managing part 240 erases corresponding data regarding the recording reservation from the reservation management data.

Figure 4:
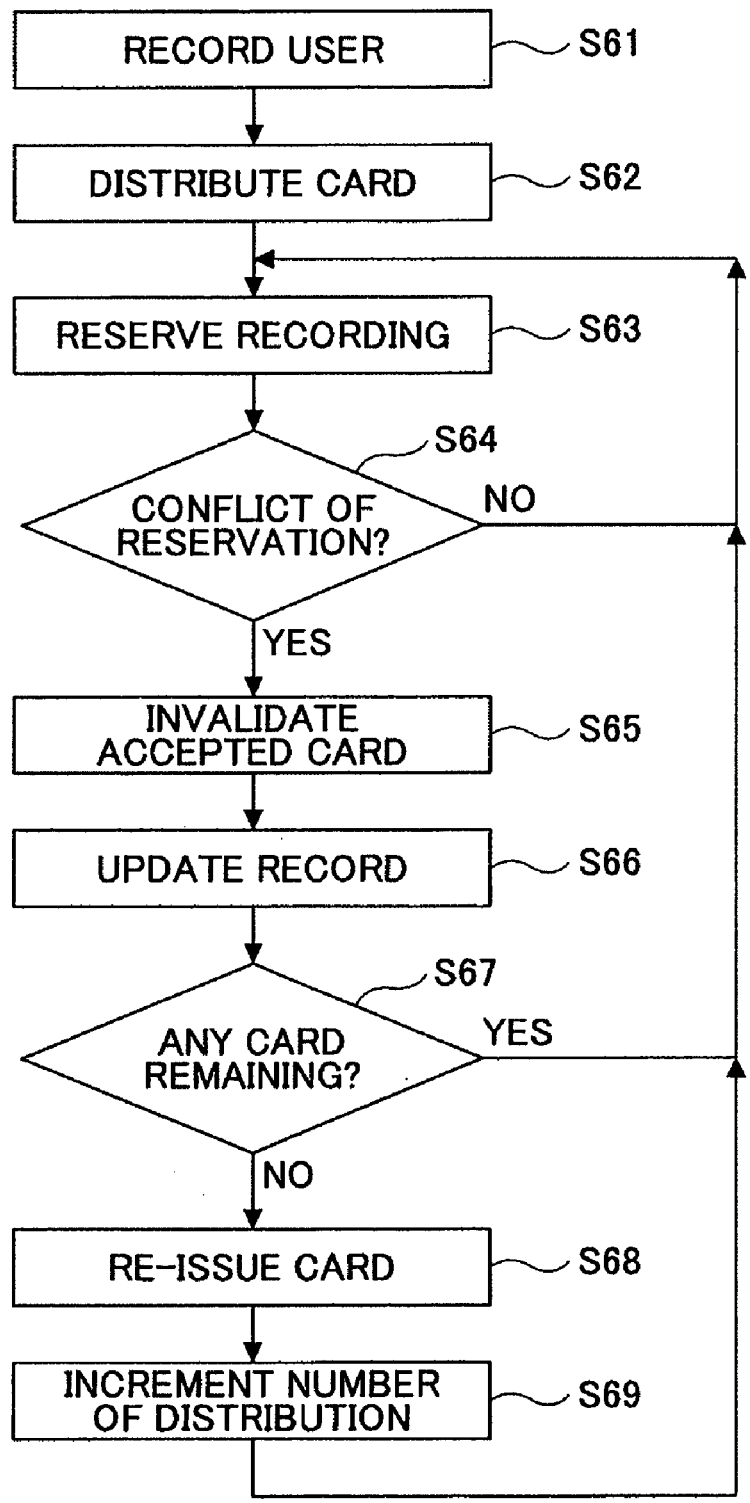
FIG. 4 is a flowchart showing a flow for processing reservation cards of a recording apparatus according to an embodiment of the present invention.

Here, a function of the reservation card is described with reference to FIG. 4. The reservation card is used for settlement in a case where conflict of reservation occurs between users.

As exemplarily shown in FIG. 7, the user card managing part 300 manages the reservation cards owned by each user in the form of a record corresponding to each user. Therefore, the entity of the reservation cards are data of the "reservation card" managed in the form of the record.

As exemplarily shown in FIG. 8, ten reservation cards are initially distributed (Steps S61, S62 in FIG. 4) to each user registered by the function of the user registering part 100. Throughout the description of the embodiments of the present invention, "distribution of reservation card(s)" refers to recording ten valid reservation cards in the record (shown in FIG. 7) corresponding to each user.

The ten reservation cards are enumerated with numbers 1 through 10. These numbers indicate the strength of the corresponding reservation card. In this embodiment of the present invention, the strength of a reservation card becomes higher as the number becomes smaller. That is, among the ten reservation cards, the number having highest strength is 1 and the number having lowest strength is 10.

In a case where a user performs reservation of recording contents by using the function of the reservation receiving part 210, the user selects and determines one card from the reservation cards distributed in the above described manner (Step S63). Then, in a case where there is a conflict of reservation (Yes in Step S64), the strengths of reservation cards are compared between conflicting reservations by the function of the comparing part 220 as described above. As a result, a reservation corresponding to a reservation card having higher strength is accepted by the function of the accepting part 230.

Accordingly, the reservation card corresponding to the reservation accepted as a result of the strength comparison is invalidated by the function of the invalidating part 250 (Step S65). Meanwhile, the reservation card corresponding to the unaccepted reservation has its validity maintained.

With respect to a reservation card invalidated by the function of the invalidating part, the reservation card managing part 300 records invalidation of the corresponding reservation card in a record (shown in FIG. 7) of the user making the recording reservation, that is, the owner of the corresponding reservation card (Step S66).

Throughout the description of the embodiments of the present invention, the "invalidated" reservation card may also be referred to as "used (reservation card)". Meanwhile, the reservation card having its validity maintained is maintained in a valid state (also referred to as "unused") in the record (shown in FIG. 7) of a corresponding user.

Accordingly, in terms of the invalidated reservation card, its owner can no longer use it for a new recording reservation. Therefore, the user is required to select and determine a reservation card other than the invalidated reservation card.

As more of one's reservations are accepted as a result of reservation conflict, more of one's cards selected during reservation become invalidated. As a result, all of one's reservation cards become invalidated (i.e. used) (No in Step S67).

Such a state is detected by the reservation card managing part 300 and reported to the reservation card distributing part 110. The reservation card distributing part 110 receiving the report newly distributes reservation cards to the user (Step S68).

In such a case, the reservation managing part 300 records "status of use" corresponding to all reservation cards 1 through 10 as valid reservation cards in the record (shown in FIG. 7) of the user and increments the "number of distribution" (Step S69).

The "number of distribution" is initially zero and is incremented a single time whenever reservation cards are distributed to the record of the user. In other words, the reservation card of each user is consumed whenever it becomes "used". In this manner, ten reservation cards are newly distributed when all ten reservation cards are consumed. When this occurs, the "number of distribution" is sequentially incremented. A history regarding consumption of reservation cards is recorded in correspondence with each user.

As described below with reference to FIG. 6, in a case where the above-described reservation conflict occurs, the "number of distribution" recorded in the record of one user is compared with that of the other before reservation cards of the users are compared. In a case where the "number of distribution" is different, the recording reservation corresponding to the one having a smaller value is accepted by the accepting part 230. In this case, comparison of the reservation is not conducted.

Thus, the comparison of reservation cards between recording reservations by the comparing part 220 is performed only when one of the "number of distribution" is equal to the other one of the "number of distribution".

That is, it may be said that the strength of the reservation cards distributed to each user gradually decreases as redistribution is repeated. As a result, in a case where the number of distribution is different according to this embodiment of the present invention, the recording reservation having a smaller number of distribution is accepted.

With this configuration, a user consuming its reservation cards at an early stage and receiving redistribution is handled with disadvantage compared to another user not consuming its reservation cards at an early stage and not receiving redistribution in a case where conflict of reservation occurs. As a result, fairness can be maintained among the users.

Next, a method of controlling a recording apparatus according to an embodiment of the present invention is described in further detail.

Figure 5A:
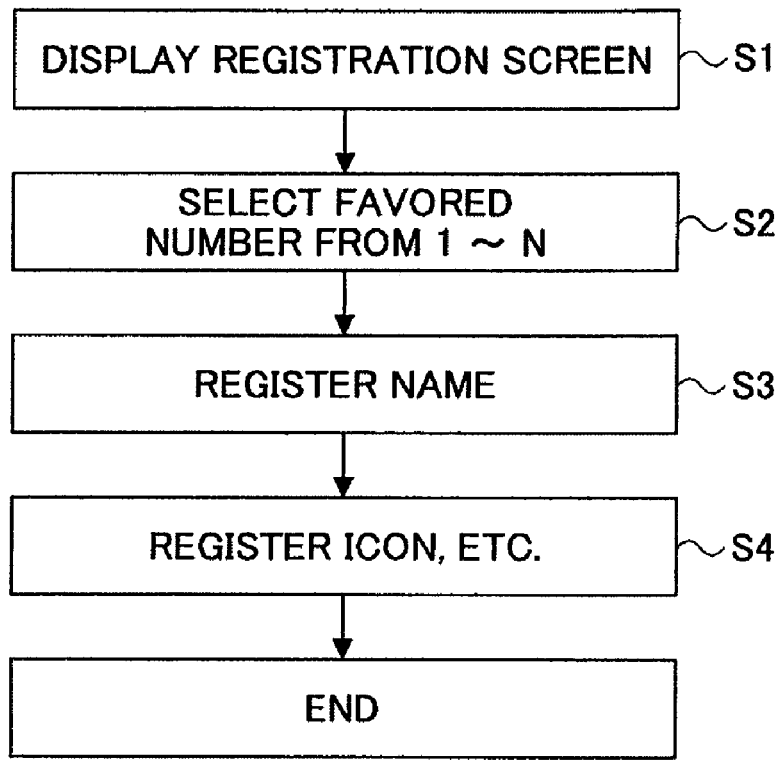
FIG. 5A is a flowchart of an operation of user registration in a recording apparatus according to an embodiment of the present invention (Part 1)
Figure 5B:
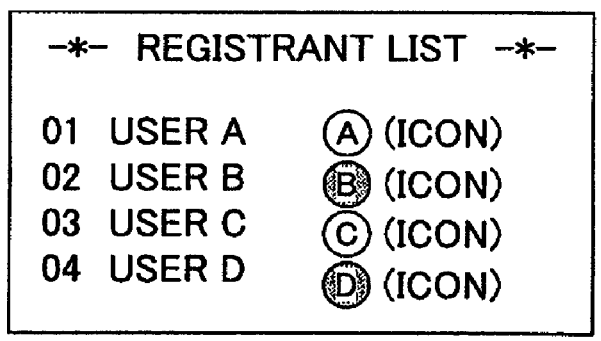
FIG. 5B is a diagram showing an example of a registrant list screen displaying users registered by the user registration of FIG. 5A.
Figure 5C:
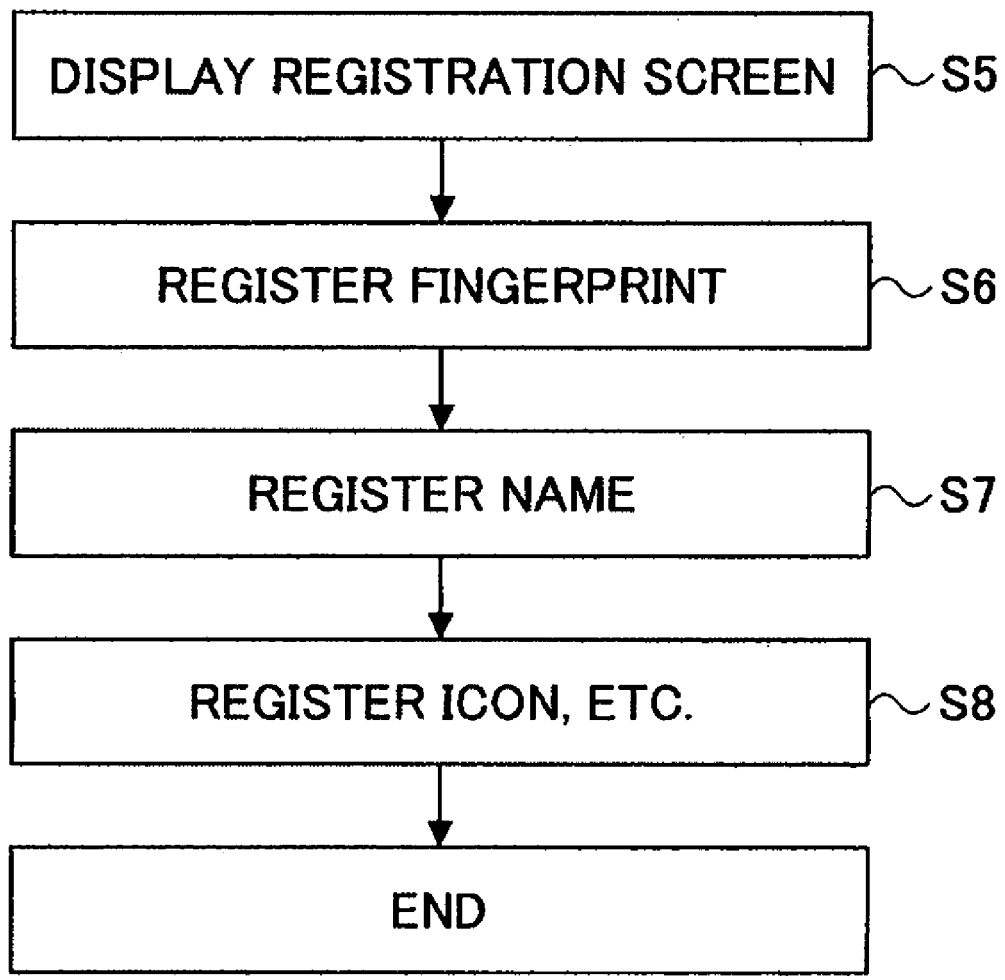
FIG. 5C is a flowchart of an operation of user registration in a recording apparatus according to an embodiment of the present invention (Part 2)

FIGS. 5A through 5C are diagrams for describing the flow of operation of user registration by the user registering part 100.

FIG. 5A shows an example where user registration is performed according to "number". FIG. 5C shows an example where user registration is performed according to fingerprint data.

In FIG. 5A, first, the user registering part, acting as one function of the above-described control program executed by the CPU 1, displays a predetermined registration screen on the display 3 (Step S1). Based on its guidance, the user selects a number from numbers 1 through n as its own number (Step S2). Then, the user registers its own name (Step S3) and selects an easily distinguishable visual identification mark (e.g., icon) (Step S4).

As a result, the user is registered as the user of the personal computer (recording apparatus). At the same time, the reservation card managing part 300, acting as one function of the above-described control program executed by the CPU 1, sets a record (shown in FIG. 7) of registration cards corresponding to the user.

It is to be noted that a "user name" instead of a "registration number" may be registered along with a "password" in the user registration from the standpoint of security. In this case, it is necessary for the user to input "user name" and "password" upon logging on. That is, user authorization is performed.

FIG. 5B shows an example of a screen displaying a list of such registered users. As shown in the screen, users A through D are registered together with their corresponding registration numbers 01 through 04 and corresponding icons A through D by performing the user registration operation described above with FIG. 5A.

Likewise, as shown in FIG. 5C, a predetermined screen is displayed on the display 3 (Step S5). Then, based on its guidance, the user registers its own fingerprint data via the fingerprint recognition device 10 (Step S6). Then, the user registers its own name (Step S7) and selects an easily distinguishable visual identification mark (e.g., icon) (Step S8).

As a result, the user is registered as the user of the personal computer (recording apparatus). At the same time, the reservation card managing part 300, acting as one function of the above-described control program executed by the CPU 1, sets a record (shown in FIG. 7) of registration cards corresponding to the user.

Next, the registration of fingerprint data of Step S6 is described. In this embodiment of the present invention, the applicant's unique fingerprint recognition technology is applied to obtaining fingerprint data of the user via the fingerprint recognition device 10 and also to fingerprint matching performed upon recording reservation (i.e. image recording reservation) using the obtained and registered fingerprint data of each user.

This technology uses a unique feature correlation method where correlations of feature points included in the patterns of fingerprints (e.g., orientation or positional relationships of endings and bifurcations of ridge lines) are matched. With this method, high precision fingerprint recognition performance can be achieved where the acceptance rate of a target person is 99% or more and the acceptance rate of a non-target person is 0.002% or less. Furthermore, high speed matching can be achieved since matching can be conducted with a relatively small amount of fingerprint data of an average of approximately 300 bytes per finger. Furthermore, with this technology, since the fingerprint data are irreversible, the actual fingerprint image cannot be reproduced, to thereby ensure privacy protection (see non-patent document 1).

In using the fingerprint recognition technology in a case of reserving recording of contents, each user slides his/her finger on the sensor part of the fingerprint recognition device 10, to thereby have his/her fingerprint data detected and matched with fingerprint data obtained and registered beforehand. As a result, a log-on part (not shown), acting as one function of the above-described control program executed by the CPU 1, allows the user to be logged on. The reservation receiving part 210 performs recording reservation with respect to the logged on user. Accordingly, in this case, the user registering part 100 has a fingerprint data obtaining function, and the log-on part has a fingerprint data matching function.

Therefore, in using the fingerprint recognition technology, the user can obtain a recording reservation function equipped with a user recognition function without going through a key entry procedure of, for example, "user name" or "password" in a situation of user registration or logging on.

It is to be noted that, since known technology may be used for the fingerprint recognition, detail description thereof is omitted.

FIG. 6 is a flowchart for explaining the flow of operations of the recording apparatus when the registered user actually conducts reservation of recording contents.

When the power of the personal computer (recording apparatus) is turned on (Step S21), the function of the log-on part displays a log-on screen on the display 3 as shown in Step S22. In response to this, the user selects its own user name. In a case where the user registration using fingerprint data described above with reference to FIG. 5C is used, the user needs only to slide its own finger on the sensor part of the fingerprint recognition device 10 in the logging-on process (Steps S22, S23). As a result, the user is automatically logged-on by the fingerprint data matching function.

Next, the user clicks a "recording reservation" button displayed on the display 3 by the function of the reservation receiving part 210 (Step S24). As a result, a recording reservation screen (i.e. contents recording reservation screen) is displayed on the display 3 by the function of the reservation receiving part 210. In response to this, the user maneuvers the operating part 2 such as the keyboard 21 or the mouse 22 to set, for example, the program or the time of the contents desired to be recorded (Step S25).

Then, a reservation card selection screen (as shown in FIG. 8) corresponding to the user who is logged on (hereinafter referred to as "logged-on user") is displayed on the display 3 by the function of the reservation receiving part 210. In response to this, the user selects a reservation card other than a "used" reservation card (Step S26).

In the example shown in FIG. 8, among the reservation cards owned by the user, cards 1, 5, and 7 are already "used". Therefore, the user is required to select a reservation card other than these cards, that is, one of cards 2, 3, 4, 6, 8, 9, and 10. Furthermore, the display of "number of distribution" on the screen shows that the user has already received redistribution of reservation cards one time.

The content displayed on the screen of FIG. 8 is based on the content recorded in the records (as shown in FIG. 7) of the reservation cards managed by the reservation card managing part 300. That is, the records are recorded with corresponding user names, the number of distribution, and the status of use for each reservation card (status indicating whether the reservation card is "used").

Then, the reservation receiving part 210 reports the content of the recording reservation set by the user (hereinafter referred to as "user 1") in Step S25 to the reservation managing part 240. The reservation managing part 240, receiving this report, verifies the newly reported content of the recording reservation with the reservation management data managed therein.

In this verification, it is determined whether there are any recording reservations of other users that conflict with the reservation time of the reported recording reservation. In a case where it is determined that no conflicting recording reservations of other users exist, the reservation managing part 240 records the reported content of the recording reservation in the reservation management data (Step S28).

On the other hand, in a case where it is determined that a conflicting recording reservation of another user (hereinafter referred to as "user 2" for the sake of convenience) exists, the "number of distribution" of the reservation cards corresponding to the user 1 and the "number of distribution" of the reservation cards corresponding to the user 2 are compared (Step S29).

In a case where the "number of distribution" of the user 1 is greater than that of the user 2 according to the comparison, the function of the accepting part 230 maintains the reservation of the user 2 in the reservation management data and preserves the reservation card selected and the determined in Step S26 by the user 1 (Step S30).

In other words, the reservation card of the user 1 does not become "used" and remains usable for the next recording reservation. Furthermore, a message "could not make reservation" is displayed on the display 3 by the function of the accepting part 230 (Step S31). Therefore, the user 1 recognizes that its recording reservation has not been executed.

On the other hand, in a case where the "number of distribution" of the user 2 is greater according to the comparison of Step S29, the accepting part 230 determines to accept the recording reservation of the user 1. As a result, the reservation card selected and determined by the user 1 in Step S26 becomes "used". As a result, the data of the corresponding reservation card in the record of the user 1 are updated as "used" (Step S32). As a result, the user 1 is unable to use the same reservation card in an onward recording reservation.

Furthermore, the accepting part 230 reports that the recording reservation of the user 1 is accepted to the reservation managing part 240. The reservation managing part 240 receiving this erases a corresponding recording reservation of the user 2 from the reservation management data and newly records the recording reservation of the user 1 accepted by the accepting part 230 instead (Step S33). Then, the erased reservation card, which was selected and determined upon recording reservation by the user 2, is preserved (Step S34). As a result, the user 2 is able to use the same reservation card again upon the next recording reservation.

Furthermore, the cancellation of the erased recording reservation is reported to the user 2 (Step S35). More specifically, by activating an electronic mail function of the personal computer, this is transmitted to a portable terminal (e.g., portable telephone) of the user by electronic mail.

In a case where both "number of distribution" are equal as a result of the determination of Step S29, the strengths of the corresponding reservation cards set upon recording reservation by the users 1 and 2 are compared (Step S36). As a result, in a case where the number of the reservation card of the user 1 is greater, that is, in a case where the strength is lower, the function of the accepting part 230 maintains the reservation of the user 2 in the reservation management data of the reservation managing part 240.

Furthermore, in this case, the reservation selected and determined by the user 1 in Step S26 is preserved (Step S37). In other words, the reservation card does not become "used" and remains usable for the next recording reservation. Furthermore, a message "could not make reservation" is displayed on the display 3 (Step S38) by the function of the accepting part 230. Accordingly, the user 1 recognizes that its recording reservation has not been executed.

On the other hand, in a case where the number of the reservation card of the user 2 is greater, that is, in a case where the strength of the reservation card of the user 1 is higher according to the determination of Step S36, the accepting part 230 determines to accept the recording reservation of the user 1. As a result, the reservation card selected and determined by the user 1 in Step S26 becomes "used" and the data of the corresponding reservation card in the record of the user 1 are updated as "used" (Step S39). As a result, the user 1 is unable to use the same reservation card in an onward recording reservation.

Furthermore, the accepting part 230 reports that the recording reservation of the user 1 is accepted to the reservation managing part 240. The reservation managing part 240 receiving this erases a corresponding recording reservation of the user 2 from the reservation management data and newly records the recording reservation of the user 1 accepted by the accepting part 230 instead (Step S40). Then, the erased reservation card which was selected and determined upon recording reservation by the user 2 is preserved (Step S41). As a result, the user 2 is able to use the same reservation card again upon the next recording reservation.

Furthermore, the cancellation of the erased recording reservation is reported to the user 2 (Step S42). More specifically, by activating an electronic mail function of the personal computer, this is transmitted to a portable terminal (e.g., portable telephone) of the user by electronic mail.

In a case where "strengths of both reservation cards are equal" as a result of the determination of Step S36, the earlier recording reservation of the user 2 is maintained (Step S43). As a result,
the strengths of the corresponding reservation cards set upon recording reservation by the users 1 and 2 are compared (Step S36). As a result, in a case where the number of the reservation card of the user 1 is greater, that is, in a case where the strength is lower, the function of the accepting part 230 maintains the reservation of the user 2 in the reservation management data of the reservation managing part 240. As a result, the reservation selected and determined by the user 1 in Step S26 is preserved (Step S44). In other words, the reservation card does not become "used" and remains usable for the next recording reservation. Furthermore, a message "could not make reservation" is displayed on the display 3 (Step S45) by the function of the accepting part 230. Accordingly, the user 1 recognizes that its recording reservation has not been executed.

Figure 9:
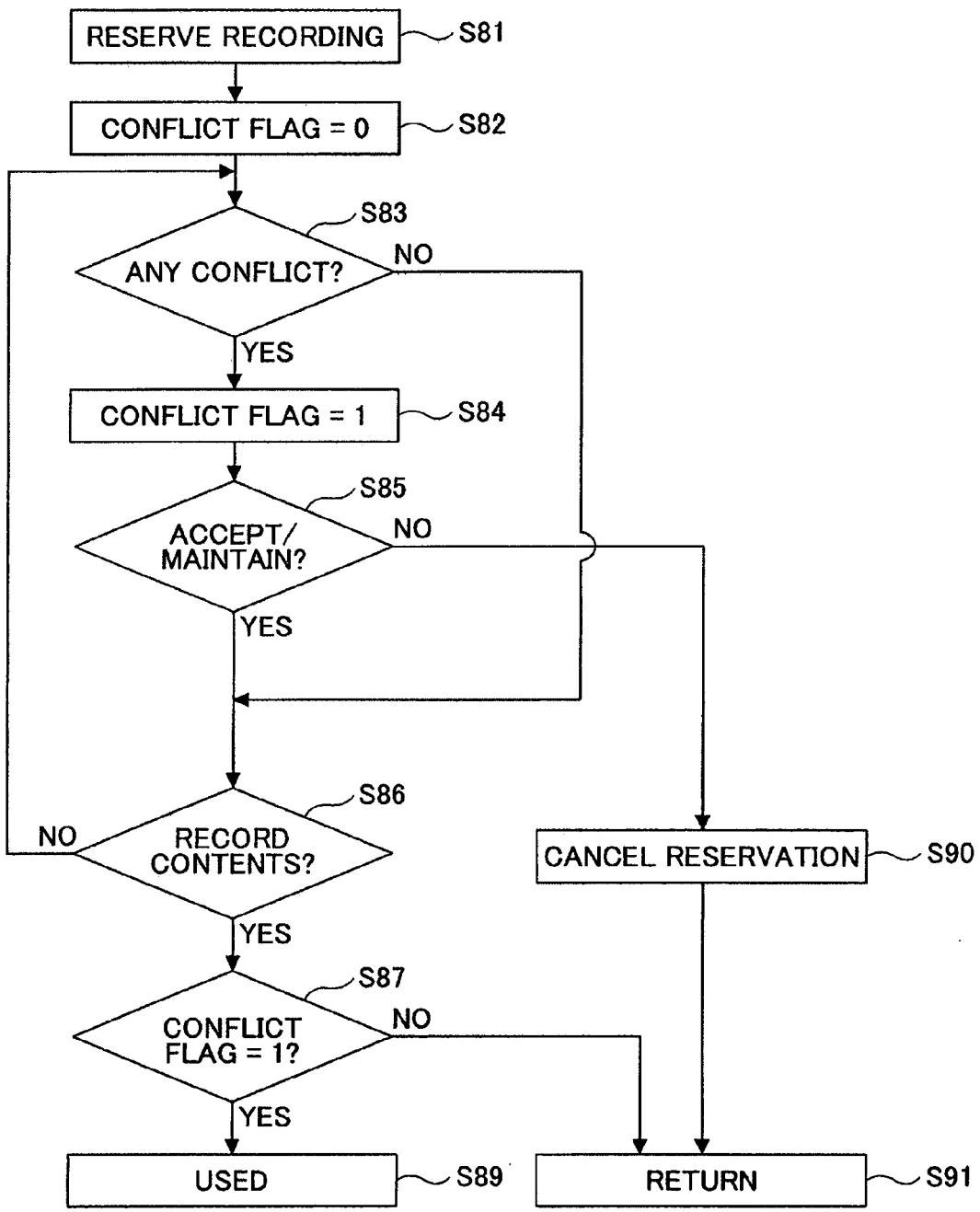
FIG. 9 is a flowchart for describing processing of reservation cards in a recording apparatus according to an embodiment of the present invention.

Next, handling of reservation cards set in the above-described recording reservation in the recording apparatus according to this embodiment of the present invention is described with reference to FIG. 9.

When the recording reservation is conducted (Step S81), a predetermined conflict flag regarding the recording reservation is set as 0 (Step S81). The conflict flag is set in correspondence with the recording reservation whenever recording reservation is conducted.

Then, if there is no conflict of reservation regarding the recording reservation (No in Step S83), the conflict flag is maintained as 0 (No in Step S87) in a case where contents of the recording reservation are recorded by the reservation managing part 240 and the recording part 400 (Yes in Step S86). As a result, the reservation cards set upon the recording reservation are preserved and remain usable for the next recording reservation (Step S91).

On the other hand, in a case where there is a conflict of reservations (Yes in Step S83), the conflict flag is set as 1 (Step S84). Then, in a case where the recording reservation is not accepted or cancelled (Step S30/S37; No in Step S85, S90) as a result of the settlement by the comparing part 220 (Step S29/S36), the reservation cards set upon the recording reservation are preserved and remain usable for the next recording reservation (Step S91).

Furthermore, in a case where contents of the recording reservation are recorded by the reservation managing part 240 and the recording part 400 (Yes in Step S86) when the recording reservation is accepted or maintained (Step S32/S39; Yes in Step S85) as a result of the settlement (Step S29/S36), the value of the conflict flag is determined. Since the conflict flag is 1 in this case (Yes in Step S87), the reservation card set upon recording reservation becomes "used" and cannot be onward selected (Step S87).

Even in a case where the recording reservation is accepted or maintained as a result of the settlement (Yes in Step S85), there may be a case where conflict of reservations reoccurs (Step S83) before contents of the recording reservation are recorded by the reservation managing part 240 and the recording part 400 (No in Step S86). In this case the same reservation cards are used and settlement is conducted again (Step S29/S36). The same processes are conducted thereafter.

Accordingly, when the recording reservation of the user is in the end maintained and has its recorded in the hard disk 5 and the like by the functions of the reservation managing part 240 and the recording part 400, the reservation card selected and determined by the user in Step S26 upon the recording reservation is processed as follows.

In a case where no conflict occurs with respect to a recording reservation, a corresponding reservation card is reserved (Step S82, S83, S90, S91). As a result, the user is able to select the same reservation card again upon the next recording reservation.

On the other hand, when corresponding contents are recorded after the corresponding reservation card becomes "used" according to the results of Step S32 or S39 in a case where there is a conflict of reservations (Steps S83, S84), the user is unable to select the same reservation card with respect to a new recording reservation.

Furthermore, in a case where conflict of reservations occurs again before the contents of the recording reservation are actually recorded (No in Step S86, Step S83) even after the corresponding reservation card once becomes "used" in the Step S32 or S39 (Steps S83, S84, Yes in S85), it is assumed that the same reservation card has the same strength in the settlement conducted again in Step S36.

Thus, the process of setting the reservation card as "used" in Step S32 or S39 is only temporary. In the case where conflict subsequently reoccurs with respect to the same recording reservation, the same strength is applied to the reservation card. After the contents are finally recorded by the recording part 400 after going through the conflict of reservations, the reservation card is finally defined as "used".

Furthermore, once a reservation card is set upon recording reservation, the reservation card can only be selected again with respect to a new recording reservation in the following cases (1) through (3).

(1) A case where a recording reservation is accepted without any conflict from the beginning and still not facing any conflict of reservations thereafter (No in Step S83, No in Step S86);

(2) A case where recording of contents corresponding to the recording reservation without going through any conflict of reservations thereafter (Yes in Step S86, No in Step S87, Step S91); and (3) A case where a corresponding recording reservation is cancelled due to a conflict of reservations (Step S90) and a corresponding reservation card is returned (Step S91).

More specifically, during the series of processes in the recording reservation described above with FIG. 6, either the status of use of the record (shown in FIG. 7) corresponding to the reservation card selected and determined with respect to the recording reservation by the user 1 with the screen (shown in FIG. 8) of the display 3 in Step S26 becomes "used" (Step S32 or S39) or is preserved as "unused" (Step S28, S30, S37, or S44).

Here, becoming "used" corresponds to a case where the recording reservation is accepted (Step S28, S33 or S40). On the other hand preserving as "unused" corresponds to a case where either the recording reservation is accepted without going through any conflict of reservation from the beginning (Step S28) or a case where the recording reservation is unaccepted and returned (Step S31, S38, or S45).

In a case where the user 1 performs the recording reservation operation of FIG. 6 in such a state, the reservation cards set as "used" are indicated as being used with an X mark and are unable to be used. On the other hand, the reservation cards in the "unused" state are indicated as usable without an X mark and are able to be used.

With the above-described embodiment of the present invention, the user of the recording apparatus, depending on circumstance, may select and determine a reservation card having high strength when strongly desiring to reserve recording of contents and select and determine a reservation card having a relatively low strength when having no such desire. Accordingly, reservation of recording can be conducted in view of circumstances of each user. Furthermore, unfairness between users can be prevented since the users are provided with the same conditions.

Furthermore, the process of settling conflict of reservations by using reservation cards is totally automated by computation of a computer. Therefore, the function of reserving recording of contents including the function of settling conflict of reservation can be achieved without adversely affecting the convenience of the user.

With the above-described embodiment of the present invention, instead of providing the users with a fixed order of priority, plural reservation cards having different strengths are equally distributed to the users. Thus, upon reservation, each user selects and determines a card from the evenly distributed reservation cards. In a case of conflict of reservations, comparison between strengths of reservations set by the users is conducted.

Therefore, the user according to its judgment can make a reservation by setting a card having a high strength when having a strong desire to achieve the reservation. When the reservation is achieved as a result of having a stronger reservation card in a case where actual conflict of reservations with respect to the reservation, the reservation card is invalidated.

In a case where reservation is achieved as a result of using a corresponding reservation card in the settlement of the conflict of reservations, the corresponding reservation card is invalidated. Therefore, in a case where reservation cards having high strengths are frequently used, the reservation cards having high strengths will be invalidated and used up at a relatively early stage. As a result, only reservation cards having low strengths will remain. Thus, the possibility of having one's reservation executed will decrease when there is a conflict of reservations.

On the other hand, preparation can be made for a case where there is a need to reserve recording of important data in the future by refraining from using strong reservation cards and preserving them. Therefore, the user whose reservation was not conducted can use the same reservation card onward. As a result, the user can set its own reservation card with security and unfairness between users can be effectively reduced.

Hence, as described above, the same conditions can be provided to each user. Furthermore, each user can discretionally use its own reservation cards.

Therefore, the user may control the order of priority for its reservation. Thus, unfairness among users can be prevented.

Furthermore, by allowing the user to set its reservation cards upon reserving recording, the actual operation of settling conflict of reservation in other words, the processes of comparing strengths of reservation cards, determining acceptance of reservation according to the comparison results, and invalidating the reservation card of the accepted reservation can be automated by using a computation function of a computer. As a result, actual negotiations among the users become unnecessary and convenience can be improved.

Further, the present invention is not limited to these embodiments, but variations and modifications may be made without departing from the scope of the present invention.

What is claimed is:

1. A recording apparatus comprising:
a recording part configured to perform a recording operation of recording image data and audio data;
a reservation card distributing part configured to distribute to a user, a plurality of reservation cards each having different strengths, the user being able to set a reservation card when reserving the recording operation;
a comparing part configured to compare strengths of each of the reservation cards set by users when there is a conflict of a reservation time between the users;
an accepting part configured to accept a reservation of the recording operation for a user having a strongest reservation card according to a result of a comparison by the comparing part; and
an invalidating part configured to invalidate a reservation card corresponding to the reservation accepted by the accepting part according to the result of the comparison.

2. The recording apparatus as claimed in claim 1, wherein the reservation card distributing part has a function of newly redistributing a reservation card to a user using up the reservation cards, wherein the reservation card distributing part is configured to sequentially reduce the strength of the reservation cards whenever a redistribution is repeated with respect to each user.

3. The recording apparatus as claimed in claim 1, wherein the reservation card distributing part is configured to newly distribute a reservation card to a user using up the reservation cards and sequentially increase a value of a number of distributions whenever a redistribution is repeated with respect to each user.

4. A method of controlling a recording apparatus comprising:
recording image data and audio data;
distributing step for distributing to a user, a plurality of reservation cards each having different strengths, the user being able to set a reservation card when reserving the recording operation;
comparing a strength of each of the reservation cards set by users when there is a conflict of a reservation time between the users;
accepting a reservation of the recording operation for a user having a strongest reservation card according to a result of a comparison by the comparing; and
invalidating a reservation card corresponding to the reservation accepted according to the result of the comparison.

5. The method of controlling the recording apparatus as claimed in claim 4, comprising:
newly redistributing a reservation card to a user using up the reservation cards, wherein in the distributing, the strength of the reservation cards is sequentially reduced whenever a redistribution is repeated with respect to each user.

6. The method of controlling the recording apparatus as claimed in claim 4, comprising:
newly distributing a reservation card to a user using up the reservation cards; and
increasing a value of number of a distributions whenever a redistribution of the reservation card is repeated with respect to each user in the redistributing, and
wherein in the comparing, the value of the number of distributions the reservation card for each user is first compared when comparing the reservation cards, and
wherein in the accepting, the reservation of a user having a smaller value of the number of distributions according to the result of the comparison is accepted.

7. A non-transitory computer-readable recording medium on which a program causing a computer to execute a method of controlling a recording apparatus, the method comprising:
recording image data and audio data;
distributing to a user a plurality of reservation cards each having different strengths, the user being able to set a reservation card when reserving the recording operation;
comparing a strength of each of the reservation cards set by users when there is a conflict of a reservation time between the users;
accepting a reservation of the recording operation for a user having a strongest reservation card according to a result of a comparison by the comparing; and invalidating a reservation card corresponding to the reservation accepted by the accepting according to the result of the comparison.

8. The non-transitory computer-readable recording medium as claimed in claim 7, comprising:

newly redistributing a reservation card to a user using up the reservation cards, wherein in the distributing, the strength of the reservation cards is sequentially reduced whenever a redistribution is repeated with respect to each user.

9. The non-transitory computer-readable recording medium as claimed in claim 7, comprising:

newly distributing a reservation card to a user using up the reservation cards; and increasing a value of a number of distributions whenever a redistribution of the reservation card is repeated with respect to each user in the redistributing, and wherein in the comparing, the value of the number of distributions of the reservation card for each user is first compared when comparing the reservation cards, and wherein in the accepting, the reservation of a user having a smaller value of the number of distributions according to the result of the comparison is accepted.

* * * * *

UNITED STATES PATENT AND TRADEMARK OFFICE
CERTIFICATE OF CORRECTION

PATENT NO. : 8,265,459 B2  
APPLICATION NO. : 12/222969  
DATED : September 11, 2012  
INVENTOR(S) : Yumiko Nakamura Page 1 of 1

It is certified that error appears in the above-identified patent and that said Letters Patent is hereby corrected as shown below:

Column 14, Line 21, In Claim 4, before "distributing to" delete "distributing step for".
Column 14, Line 49, In Claim 6, delete "the" and insert -- of the --, therefor.

Signed and Sealed this
Twenty-ninth Day of January, 2013

David J. Kappos
*Director of the United States Patent and Trademark Office*